United States Patent
Carlson (10) Patent No.: US 11,314,516 B2
(45) Date of Patent: Apr. 26, 2022

(54) ISSUING INSTRUCTIONS BASED ON RESOURCE CONFLICT CONSTRAINTS IN MICROPROCESSOR

(71) Applicant: CAVIUM, LLC, San Jose, CA (US)

(72) Inventor: David Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 297 days.

(21) Appl. No.: 15/875,611

(22) Filed: Jan. 19, 2018

(65) Prior Publication Data

US 2019/0227805 A1    Jul. 25, 2019

(51) Int. Cl.
G06F 9/38    (2018.01)

(52) U.S. Cl.
CPC .......... G06F 9/3836 (2013.01); G06F 9/3885 (2013.01)

(58) Field of Classification Search
CPC .... G06F 9/3836; G06F 9/4881; G06F 9/3885; G06F 9/28; G06F 9/3851; G06F 9/3853; G06F 8/445
See application file for complete search history.

(56) References Cited

U.S. PATENT DOCUMENTS

| | | | | |
|---|---|---|---|---|
| 5,560,028 A * | 9/1996 | Sachs | ............ | G06F 9/3802 712/23 |
| 6,487,550 B1 * | 11/2002 | Cutter | ............ | G06F 7/74 |
| 7,984,270 B2 * | 7/2011 | Luick | ............ | G06F 9/3838 712/214 |
| 7,984,271 B2 * | 7/2011 | Sakamoto | ............ | G06F 9/30181 712/217 |
| 9,733,940 B2 * | 8/2017 | Gschwind | ............ | G06F 9/30145 |
| 2003/0188132 A1 * | 10/2003 | Keltcher | ............ | G06F 9/30101 712/215 |
| 2006/0101241 A1 * | 5/2006 | Curran | ............ | G06F 9/382 712/215 |
| 2009/0113181 A1 * | 4/2009 | Comparan | ............ | G06F 9/3885 712/215 |
| 2009/0210665 A1 * | 8/2009 | Bradford | ............ | G06F 9/3814 712/215 |
| 2010/0250901 A1 * | 9/2010 | Abernathy | ............ | G06F 9/3838 712/214 |
| 2010/0274995 A1 * | 10/2010 | Matsuyama | ............ | G06F 9/3838 712/216 |
| 2010/0275211 A1 * | 10/2010 | Webber | ............ | G06F 9/3851 718/103 |
| 2014/0373022 A1 * | 12/2014 | Chan | ............ | G06F 9/3875 718/103 |
| 2016/0291980 A1 * | 10/2016 | Ge | ............ | G06F 9/3557 |

* cited by examiner

*Primary Examiner* — Courtney P Carmichael-Moody (57) ABSTRACT

Systems and methods of selecting a collection of compatible issue-ready instructions for parallel execution by functional units in a superscalar processor in a single clock cycle. All possible instructions (opcodes) to be executed by the functional units are pre-arranged into several scenarios based on potential resource conflicts among the instructions. Each scenario includes multiple groups of predefined instructions. During operation, concurrently for all the groups, an issue-ready instruction is identified with reference to each group based on group-specific selection policies. Further, based on the identified instructions, predefined policies are applied to select one or more scenarios and select among the picks of the selected scenarios. As a result, the output instructions of the selected scenarios are issued for parallel execution by the functional units.

22 Claims, 9 Drawing Sheets

```
// Scenario 1, Pick0: shift2, alu_2d, load, fload, load_2d, store, fstore, system0    (compat[0])
//            Pick1: alu0, alu1, alu2, alu3s, imul, imul_3s, idiv                      (compat[1])
//            Pick3a:fmul, fmul_3s, fshft_1s                                           (compat[2])
//            Pick3b:fmul, fshft_1s                                                    (compat[4])
//            Pick4a: fadd, fdiv, fimm, merge_2d                                       (compat[3])
//            Pick4b: fadd, fdiv, fimm                                                 (compat[6])
//            Pick3sel: fstore                                                         (compat[5])
//            Pick4sel: fload, fload_2d, itof, ftoi_1s                                 (compat[18])

// Scenario 2, Pick0: fload_2d, store_3s, fstore_3s, alu_3s, alu_2d3s, imul_3s, system1, ftoi_1s, itof (compat[7])
//            Pick1: alu0, alu1, alu2                                                  (compat[8])
//            Pick3: (itof will use this write port)
//            Pick4a: fadd, fdiv, fimm, merge_2d                                       (compat[3])
//            Pick4b: fadd, fdiv, fimm                                                 (compat[6])
//            Pick4sel: fload, fload_2d, itof, ftoi_1s                                 (compat[18])

// Scenario 3, Pick0: alu0, alu1, alu2, shift1, idiv, imul, itoe                       (compat[9])
//            Pick1: alu2 - this will be in reverse order                              (compat[10])
//            Pick3: fmul, fmul_3s, fshft_1s                                           (compat[2])
//            Pick4: fadd, fsel_3s, fdiv, fcmp_2s, fcmp_3s, fimm, merge_2d             (compat[11])
```

FIG. 3A

```
// Scenario a, Pick2a: load
//         Pick2a disallowed by load_2d, fload_2d, alu_2d, alu_2d3s, alu_3s, shift2,    (compat[12])
//                              fcmp_2s, fcmp_3s, ftoi_2s, imul_3s, fstore_3s,
//                              load(128b), store, fstore, system0, load_unpriv        (compat[13])

// Scenario b, Pick2b: alu0, alu1, shift1, itof                                        (compat[14])
//         Pick2b disallowed by store_3s, alu_2d, alu_3s, alu_2d3s, load_2d, fload_2d, imul_3s, fcsel, ftoi, fcmp, merge_2d,
fstore                                                                                 (compat[15])

// Scenario c, Pick2c: fshft_1s, fimm                                                  (compat[16])
//         Pick2c disallowed by fload, fload_2d, fmul_3s, fstore, fstore_3s, ftoi_1s, merge_2d  (compat[17])
```

ISSUING INSTRUCTIONS BASED ON RESOURCE CONFLICT CONSTRAINTS IN MICROPROCESSOR

TECHNICAL FIELD

Embodiments of the present invention are related to the field of microprocessors, and in particular, to instruction issue mechanisms in microprocessors.

BACKGROUND OF THE INVENTION

Superscalar processors offer enhanced execution parallelism as multiple scalar instructions can be executed by functional units independently and concurrently in a single clock cycle. The resources required to execute an instruction usually include operands of the instruction and execution hardware resources. Instructions having such required resources available are said to be ready for execution, or "issue-ready" herein. An issue-ready instruction could be issued in isolation without any data dependency or control dependency problem. However, due to hardware resource constraints in a superscalar processor, some instructions (even with different opcodes) share the same hardware used in the execution stage, such as register files, register file ports, and execution units, etc. Issuing more than one instruction at one time may cause conflict if the instructions compete for execution resources, even though each of them is ready to issue individually.

To avoid execution resource conflicts among issued instructions, one existing solution is to provide enough register file bandwidth needed by each functional unit. Each functional unit has an instruction queue and the oldest instruction in the queue is issued each time. In this way, the dependency among the functional units is eliminated and each functional unit can execute independently of each other. However, to achieve enough register file bandwidth, extra register file ports are usually needed, which undesirably increases logic complexity and manufacturing cost of the processor.

Another approach is to first pick the oldest issue-ready instruction in an instruction queue. The next oldest instruction that is compatible with the first-pick is then picked. For example, if the oldest in the queue is a "shift" instruction, the queue is then searched for an instruction that does not use the only shifter functional unit. In the same manner, following that, the third oldest instruction compatible with the first two picks are picked, and so on. This can guarantee compatibility among a resultant collection of picked instructions for parallel execution, but unfortunately requires complex logic and long latency. More specifically, finding the oldest instruction is typically implemented using "find-first" logic which basically has the latency of a single "add" circuit, whereas finding the second-oldest instruction can be implemented using "find-second" logic which has the latency of two "add" circuits operating in serial. Thus, it typically requires twice as long time to compute the second instruction as to compute the first one. As a result, the overall latency adds up and causes a bottleneck of the processor performance.

SUMMARY OF THE INVENTION

Accordingly, disclosed herein is directed to a high speed mechanism of discovering a collection of compatible issue-ready instructions for parallel execution in a superscalar processor for a given clock cycle.

Embodiments of the present disclosure provide instruction issue logic in a processor operable to determine a collection of compatible issue-ready instructions based on several predefined scenarios, each scenario including a set of predefined groups (or "picks" herein) of instructions, more specifically, instruction opcodes. The configurations of the picks and the scenarios take into account all possible conflicts among all instructions for purposes of parallel execution, e.g., conflicts in access to register files, register file ports, and/or functional units.

A collection of compatible instruction can be determined through an identification stage and a selection stage. In the identification stage and concurrently for all the picks of the several scenarios, an instruction queue storing issue-ready instructions is accessed to identify a respective instruction comprised both in the queue and each pick. The identification operations (or "picking" operations herein) may be performed by parallel finding circuits configured for the respective picks. In this manner, a set of instructions can be identified from the instruction queue in parallel, e.g., one instruction being identified for one pick. The instructions included in the picks and scenarios, and correspondingly the respective finding logic, are configured such that a set of identified instructions within each scenario are compatible with each other. Each finding circuit can operate independently regardless of the identification result from any other finding circuit.

Further, the issue logic includes selection logic configured to, in the selection stage, select one or more scenarios according to predefined policies. As a result, the identified instructions resulting from the identification stage of the selected scenarios are supplied for parallel execution by the functional units. More specifically, the issue logic may include a first type of scenarios, each scenario having a first pick and a second pick and associated with a different priority level. In each first type scenario, each instruction in its first pick (or "first pick instruction) is compatible with any instruction in its second pick (or "second pick instruction)". In some embodiments, the finding logic configured for the first or the second pick may identify an instruction from the instruction queue by using a find-first process in the identification stage. In the selection stage, a first type scenario is selected provided that a first pick instruction thereof is identified from the instruction queue and no first pick instruction of any other scenarios of a higher priority is identified from the queue. Once a first type scenario is selected in the selection stage, the instruction identified for the second pick of the scenario is issued and executed together with the first pick instruction.

In some embodiments, an instruction may be included in both the first and the second picks of the same scenario. To prevent identifying the same instruction for both picks, the finding logic for the first pick may implement a find-first process, whereas the second pick may implements a different finding process, e.g., a find-last process.

Preferably, the instruction issue logic ensures forward progress so that there is always at least one instruction being issued for a given clock cycle. A default scenario may be defined and is associated with the lowest priority among the first type of scenarios. In the selection stage, even if no instruction of any first pick (e.g., including the first pick of the default scenario) is identified in the identification stage, the default scenario is selected and the identified instructions thereof are issued for parallel execution. In some embodiments, every possible integer instruction is included in one of the first picks (which have priority over the corresponding second picks), and every possible floating point instruction is included in the default scenario. This advantageously prioritizes integer instruction executions as well as ensures forward progress.

Moreover, a first type scenario may also includes a third pick, a fourth pick and a fifth pick, where the third pick specifies an instruction that is incompatible with an instruction in the fourth pick, whereas each instruction in the third pick is compatible with any instruction of the fifth pick. In the selection stage, if the instruction in the third pick is identified from the instruction queue (regardless of whether this instruction is selected in the resultant collection) and if this first type scenario is a selected scenario, the identified instruction from the fourth pick is not selected while the identified instruction from fifth pick is selected. For instance, if it is determined that an instruction from the third pick exists in the instruction queue, then, in the selection stage, the fifth pick (instead of the fourth pick) is selected to supply its identified instruction (if any) for the resultant collection. However, if no instruction from the third pick exists in the instruction queue, then, in the selection stage, the fourth pick (instead of the fifth pick) is selected to supply its identified instruction (if any) for the resultant collection.

The issue logic may also include a second type of scenarios, where each second type scenario includes a sixth pick and a seventh pick containing a group of instructions that are incompatible with the instruction in the sixth pick. If any instruction in the seventh pick is identified from the instruction queue, regardless whether it is selected in the resultant collection, the sixth pick instruction is disallowed and will not be include in the resultant collection. That is, the second type scenario is not selected. On the other hand, if no instruction in the seventh pick is identified from the queue, the selection logic selects this second type scenario, along with a selected first type scenario, and accordingly the sixth-pick instruction is issued for parallel execution. For instance, if no instruction from the seventh pick exists in the queue, then, in the selection stage, the sixth pick is selected to supply its identified instruction (if any) for the resultant collection. On the other hand, if an instruction from the seventh pick exists in the queue, then, in the selection stage, the sixth pick is not selected to supply its identified instruction (even if any) for the resultant collection.

Accordingly to embodiments of the present disclosure, a collection of two or more issue-ready instructions can be obtained for a given clock cycle based on predetermined scenarios. The pre-arrangements of the scenarios and groups, as well as the corresponding policies of selecting a set of issue-ready instructions within each scenario, advantageously ensure compatibility among the selected instructions and forward progress in each cycle. Moreover, the pre-arrangements and the selection policies allow the picking operations for all the picks across the scenarios to be performed independently of each other, and therefore can be performed in parallel (e.g., each through a single find-first process). The parallel operations advantageously result in substantial processing speed enhancement, since deciding which scenario(s) to use can be even faster, e.g., through a zero-detect process.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Issuing Instructions Based on Resource Conflict Constraints in Microprocessor Overall, embodiments of the present disclosure provide a mechanism of selecting a collection of compatible issue-ready instructions for parallel execution by functional units in a superscalar processor for a given clock cycle. All possible instructions, particularly instruction opcodes, to be executed by the functional units are arranged into several scenarios, each scenario including multiple groups of instructions. The scenarios and the groups are predetermined based on potential conflicts among the instructions. During operation, concurrently for all the groups, an issue-ready instruction is identified for each group based on group-specific selection policies, e.g., from an instruction queue. Further, based on the identified instructions, predefined policies are applied to select one or more scenarios and select among the picks of the selected scenarios.

Figure 1:
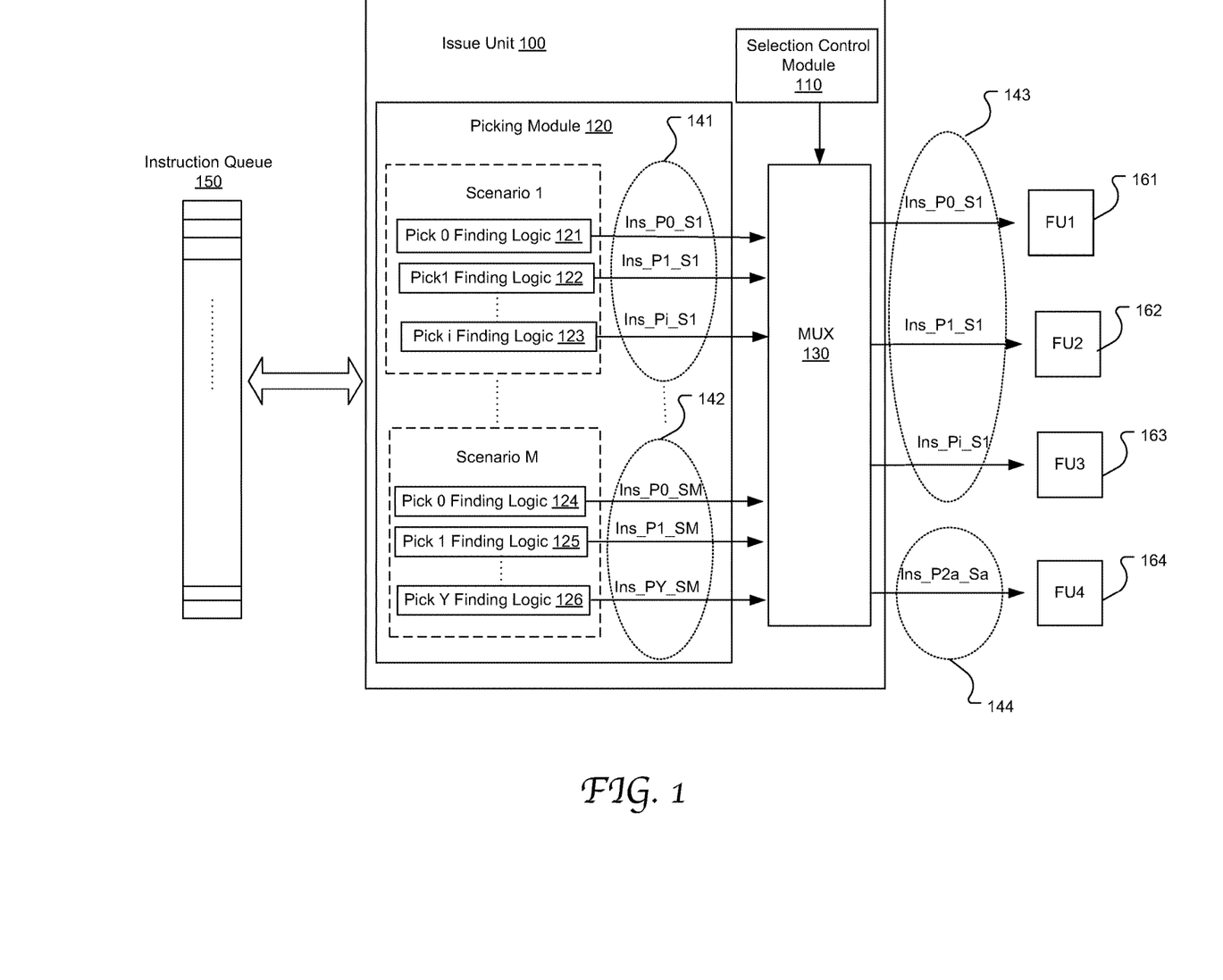
FIG. 1 illustrates the configuration of an exemplary issue unit configured to determine a collection of compatible issue-ready instructions based on predefined scenarios in accordance with an embodiment of the present disclosure.

FIG. 1 illustrates the configuration of an exemplary issue unit 100 configured to determine a collection of compatible issue-ready instructions based on predefined scenarios in accordance with an embodiment of the present disclosure. The issue unit 100 is coupled to multiple functional units 161-164 and an instruction queue 150 that stores or otherwise maintains currently issue-ready instructions. The instruction queue can be implemented as an instruction buffer or any other suitable manner that is well known in the art. Each instruction in the queue 150 is ready to be issued without any data dependency or control dependency problem if it is issued in isolation. However, there may be potential conflicts among the instructions in the queue due to execution resource constraints. The issue unit 100 operates to select a collection of compatible instructions (e.g., 143-144) from the queue 150 and supply them to the functional units 161-164 for parallel execution in a single clock cycle.

According to embodiments of the present disclosure, several scenarios are predefined, each scenario including a set of predefined groups (or "picks" herein) of instructions, more specifically, instruction opcodes to be executed by the functional units 161-164. The compositions and arrangements of the picks and the scenarios take into account all possible conflicts among all instructions for purposes of parallel execution, e.g., conflicts in access to register files, register file ports, and/or functional units. As illustrated in FIG. 1, Scenario 1 includes Pick 0, Pick 1, . . . , and Pick i; and Scenario M includes Pick 0, Pick 1, . . . , and Pick Y.

In the illustrated example, a collection of compatible instruction can be determined through a picking stage (or "identification stage" herein) and a selection stage by using a picking module 120 and a selection module respectively, the selection module having a selection control module 110 and a multiplexer (MUX) 130 for example. Corresponding to each pick, the picking module 120 includes respective finding logic (e.g., 121, . . . , 126) configured to identify an instruction that is encompassed in the pick from the instruction queue 150.

It will be appreciated that the present disclosure is not limited to any specific technique, configuration or algorithm used to implement the finding logic that can identify an instruction that is encompassed both in the instruction queue and in a pick. For example, the finding logic can include a find-first circuit operable to finding the first entry in the queue that is encompassed in the pick, or a find-oldest circuit for finding the oldest entry in the queue that is encompassed in the pick. The finding logic for different picks may be implemented in different algorithms, for instance, some using find-first while some others using find-last.

In the identification stage, the finding logic in the picking module 120 operates in parallel with respect to all the picks. The finding logic identifies an instruction from the queue 150 for each pick independently and without regard to the identification result from any other pick. As illustrated, for instance, the Pick 0 finding logic 121 identifies instruction Ins_P0_S1 that is included in both the queue 150 and the Pick 0 of Scenario 1; the Pick 1 finding logic 125 identifies instruction Ins_P1_SM that is included in both the queue 150 and the Pick 1 of Scenario M. A set of instructions 141 are identified for Scenario 1, and a set of instructions 142 are identified for Scenario M.

In the selection stage, the selection control module 110 and the MUX 130 select one or more scenarios according to predefined policies and based on the identification results. The policies may be pick-specific, as described in greater detail below. As a result, the identified instructions of the selected scenarios are issued for parallel execution by the functional units 161-164. In this example, Scenario 1 is selected and its identified instructions 143 are issued to functional units 161-163 respectively. Also selected is instruction Ins_P2a_Sa of Scenario A (not explicitly shown) which is issued to functional unit 164 contemporaneously with instructions 143. The selection control module 110 may use zero-detect logic to detect the identification results of the picks, based on which the scenario selection decision can be made. Thus, according to the present disclosure, finding a collection of compatible instructions may only consume the timing of a find-first plus the latency of the MUX. The resultant latency is advantageously and substantially lower than the existent approaches as noted above.

Figure 2:
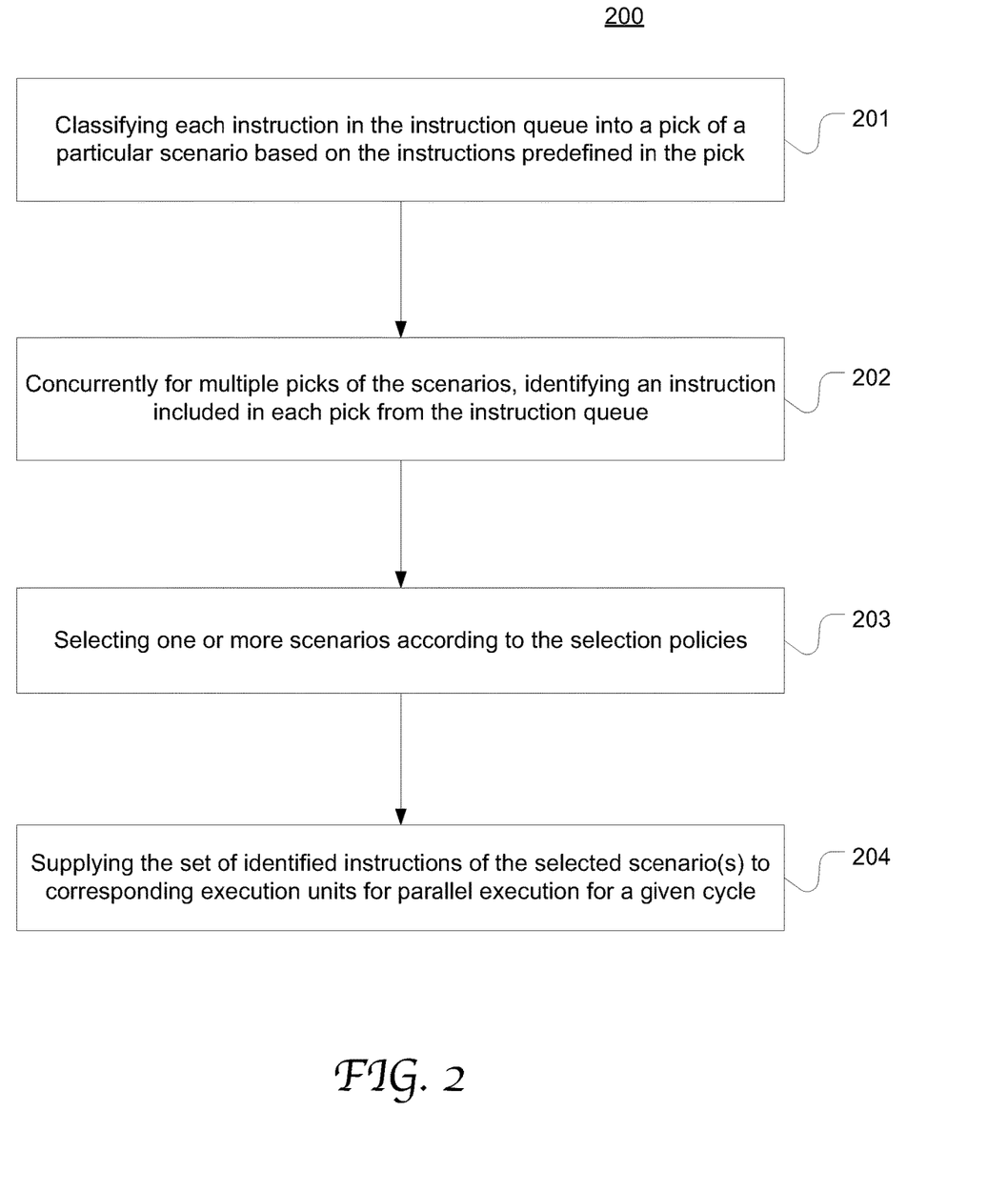
FIG. 2 is a flow chart depicting an exemplary process of determining a set of compatible issue-ready instructions for parallel execution by functional units in a superscalar processor in accordance with an embodiment of the present disclosure.

FIG. 2 is a flow chart depicting an exemplary process 200 of determining a collection of compatible issue-ready instructions for parallel execution by functional units in a superscalar processor in accordance with an embodiment of the present disclosure. Process 200 may occur in the instruction-issue window and may be performed by the decoding and issue logic in the processor. The issue logic may be implemented in a similar configuration as shown in FIG. 1. However process 200 may be performed by any other suitable logic without departing from the scope of the present disclosure.

At 201, an issue-ready instruction in the instruction queue is classified into a pick in a scenario based on the predefined instruction composition in the pick. For example, the decoding logic may associate the instruction with a compatibility vector corresponding to the pick, as described in greater detail with reference to FIG. 5 below.

At 202, concurrently for multiple picks (e.g., all the picks or selected picks) across various scenarios, an instruction is identified from the instruction queue for each pick. If the instruction queue contains multiple instructions belonging to the same pick, the oldest one, the first one or the last one among them may be selected as the identified instruction. However, any other suitable process that is well known in the art may also be used to select an instruction from the queue. Further, in some other embodiments, more than one instruction may be identified for one pick without potential conflict.

At 203, one or more scenarios are selected according to predefined selection policies. The selection policies may also specify which of the identified instructions in a selected scenario may or may not be included in the resultant collection of compatible instructions, as described in greater detail with reference to FIGS. 4A-4C. Accordingly, at 204, some or all of the identified instructions of the selected scenarios resulting from 202 are issued to the corresponding functional units for parallel execution in one clock cycle.

Figure 3A:
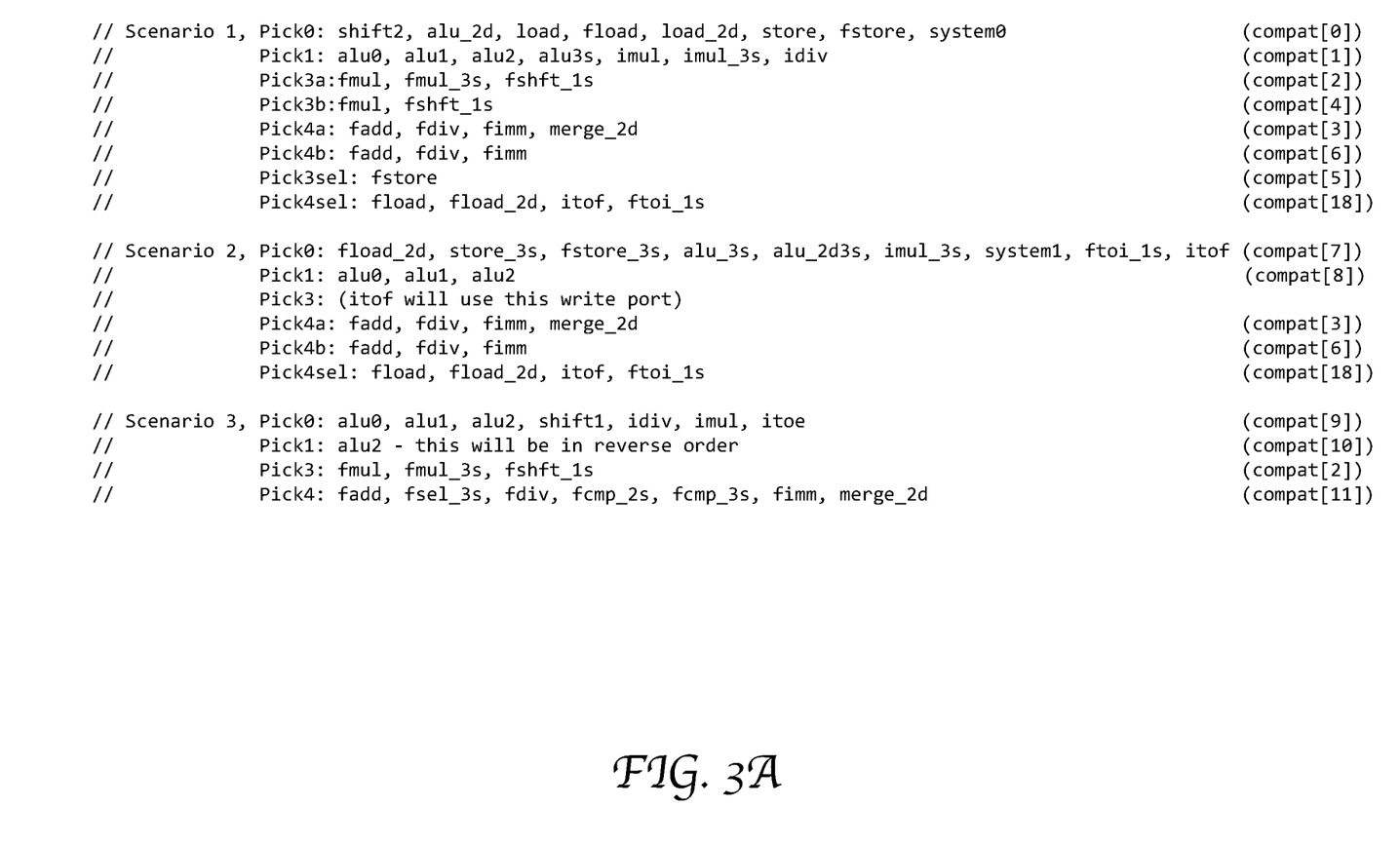
FIGS. 3A-3B show the instruction opcodes compositions of exemplary picks and scenarios predefined for a superscalar processor in accordance with an embodiment of the present disclosure.
Figure 3B:
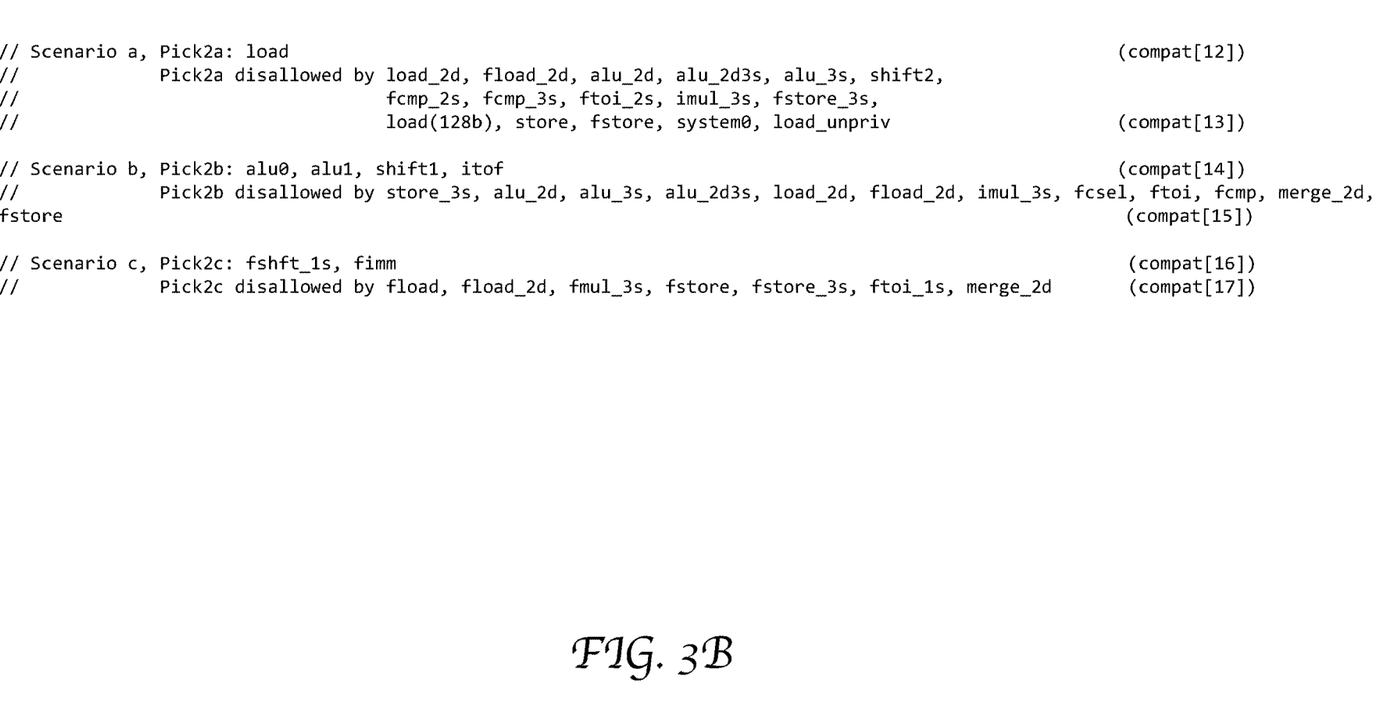

FIGS. 3A-3B show the predefined opcodes compositions of exemplary picks and scenarios a superscalar processor in accordance with an embodiment of the present disclosure. There are first type scenarios, Scenarios 1-3, and second type scenarios, Scenarios a-c shown in FIG. 3B. The associated issue logic can determine up to 4 compatible instructions for a given clock cycle. However, it will be appreciated various other viable arrangements and compositions of instruction picks and scenarios, as well as the priority levels and selection policies associated therewith, can be used without departing from the scope of the present disclosure.

It will be appreciated that the present disclosure is not limited by encoding or decoding mechanisms or instruction type. In this example, the prefix "f" at the beginning of each instruction denotes that it is a floating point instruction; and the affix "_number" denotes the number of operands or result destinations of the instruction, with the default number being 1. For example, "alu_2d" represents an "alu" operation producing two result destinations; and "fmul_3s" represents a floating point multiplication operation requiring 3 input operands. "itof" represents an integer-to-floating point conversion, or vice versa. The meanings of the instruction opcodes in FIGS. 3A and 3B are self-explanatory and detailed explanation is omitted for the sake of brevity.

Scenarios 1-3 each have a Pick 0 and a Pick 1. In each of Scenarios 1 and 2, all instructions in Pick 0 are compatible with the all the instructions in Pick 1. Scenarios 1-3 are attached with different priority levels, namely Scenario 1>Scenario 2>Scenario 3. Scenario 3 is set as the default scenario.

In the selection stage, one of these scenarios is selected provided that a Pick 0 instruction thereof is identified from the instruction queue and no Pick 0 instruction of any other scenarios of a higher priority is identified from the queue. Particularly, if a Pick 0 instruction of Scenario 1 is issue-ready and identified from the issue-ready queue, then Scenario 1 is selected, regardless of whether a Pick 0 instruction of Scenario 2 or 3 is identified from the queue; else if a Pick 0 instruction of Scenario 2 is identified from the queue, then Scenario 2 is selected; else Scenario 3 is selected. Even if no Pick 0 instruction of any scenario is issue-ready (e.g., including Pick 0 of the default scenario), Scenario 3 is selected by default and the identified instructions thereof can be issued for parallel execution. In this case, the resultant collection of instructions may include only Pick 3 and Pick 4 instructions of Scenario 3.

In this embodiment, every possible integer instruction is included in one of the Pick 0s (which have priority over the corresponding second picks), and every possible floating point instruction is included in the default scenario. This advantageously prioritizes integer instruction executions as well as ensure forward progress such that at least one issue-ready instruction is issued for a given execution cycle.

In this embodiment, the instruction "alu2" is included in both Pick 0 and Pick 1 in Scenario 3. To prevent identifying the same instruction for both picks, the finding logic for the Pick 0 may implement a find-first process whereas the Pick 1 may implements a reversed finding process, namely a find-last process.

Scenario 1 includes a set of picks subject to a different selection policy than Pick 0 and Pick 1, namely Pick 3sel and Pick 3a and Pick 3b. Pick 3sel specifies an instruction that is incompatible with an instruction in Pick 3a, whereas each instruction in Pick 3b is compatible with the Pick 3sel instruction. Pick 3a and Pick 3b have the same group of instructions except the one that is incompatible with the Pick 3sel instruction. With such arrangements, the finding logic of Pick 3sel and Pick 3a and Pick 3b can operate in parallel and independently of each other. The identified instructions from the picks are then selected without requiring complicated logic.

During operation, if Scenario 1 is the selected scenario and if the Pick 3sel instruction is issue-ready and identified from the queue, an identified Pick 3b instruction is selected in the resultant collection for parallel execution, along with the identified Pick 0 and Pick 1 instructions of Scenario 1. Otherwise, an identified Pick 3a instruction is selected, and the identified Pick 3b instruction is not. In either case, the Pick 3sel instruction is not necessarily the identified instruction for Pick 0.

In this example, Pick 3sel specifies the instruction "fstore" for a floating point store operation. Due to the particular functional unit configurations, "fstore" conflicts with any multiplication operation "fmul_3s" that requires 3 operands which is included in Pick 3a. Thus, if an "fstore" instruction is issue-ready, Pick 3b is selected and Pick 3a is not.

Similarly, Scenario 1 includes Pick 4sel and Pick 4a and Pick 4b, where Pick 4sel specifies a group of instructions that is incompatible with the instruction "merge_2d" that is included in Pick 4a. Pick 4b has the same group of instructions as Pick 4a except without instruction "merge_2d." During operation, if Scenario 1 is the selected scenario and if any of the Pick 4sel instructions is issue-ready and identified from the queue, an identified Pick 4b instruction is selected in the resultant collection for parallel execution. Otherwise, an identified Pick 4a instruction is selected, instead of the identified Pick 4b instruction. Pick 4sel and Pick 4a and Pick 4b in Scenario 2 have the similar relationship.

One or more second type of scenarios may be selected in addition to a first type scenario, where each second type scenario includes a pair of picks, one pick containing a group of instructions that conflict with and thus disallow the instruction in the other. Referring to FIG. 3B. For example, if the Pick 2a instruction is identified from the queue, Scenarios a is selected only if none of the instructions in the "Pick 2a disallowed by" pick is issue-ready. The picks in Scenarios b and c have the similar relationship.

A second type scenario may serve to produce an instruction and make efficient use of an extra register file port or other resource whenever it is not used by other higher-priority instructions as those specified in the "disallowed by" pick. However, a second type scenario may be configured for any other purposes without departing from the scope of the present disclosure.

Accordingly to embodiments of the present disclosure, a collection of two or more issue-ready instructions can be obtained for parallel execution at a given cycle based on predetermined scenarios. The pre-arrangements of the scenarios and picks, as well as the corresponding policies of selecting scenario(s) and selecting instructions advantageously ensure compatibility among the resultant collection of instructions and forward progress in each issue window. Moreover, the pre-arrangements and the selection policies allow the identification operations for all the picks across the scenarios to be performed independently of each other, and therefore can be performed in parallel, e.g., each through a single find-first process. The parallel operations advantageously result in substantial processing speed enhancement, since deciding which scenario(s) to use can be even faster, e.g., through a zero-detect process.

Figure 4A:
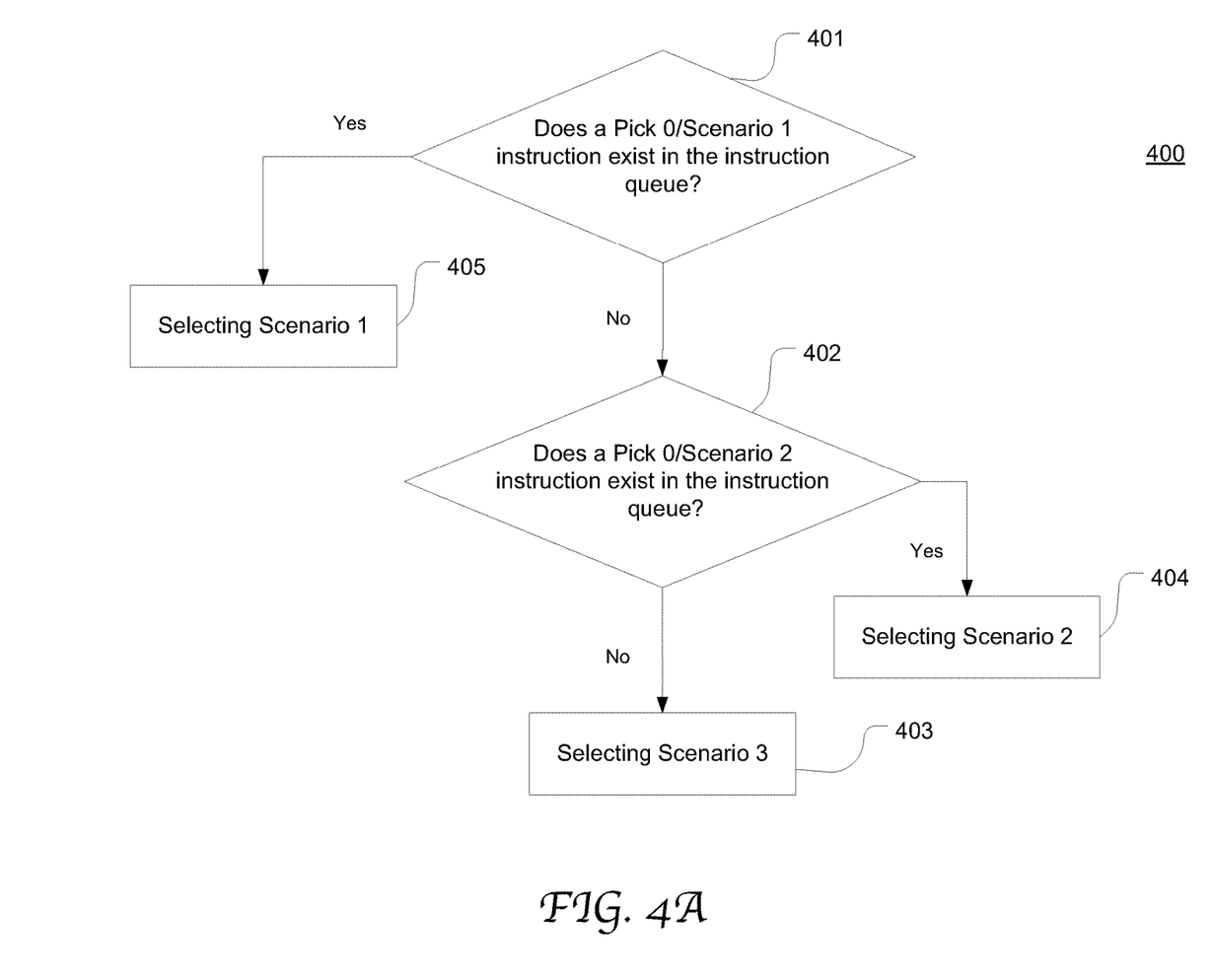
FIG. 4A is a flow chart depicting an exemplary process of selecting a first type of scenarios based on instruction identification results given the predefined picks and scenarios shown in FIGS. 3A-3B in accordance with an embodiment of the present disclosure.

FIG. 4A is a flow chart depicting an exemplary process 400 of selecting a first type scenario based on instruction identification results given the predefined picks and scenarios shown in FIGS. 3A-3B in accordance with an embodiment of the present disclosure. Process 400 may be performed by the selection control module 110 in FIG. 1 for example. Scenarios 1-3 are first type scenarios and have different priority levels. Assuming, for each pick, the finding logic has identified an issue-ready instruction from the instruction queue that belongs to the pick. At 401, it is determined whether a Pick 0 instruction of Scenario 1 has been identified from the queue. If yes, Scenario 1 is selected at 405. Therefore, the identified instructions of Pick 0, Pick 1, Pick 3a or Pick 3b, and Pick 4a or Pick 4b are output from the multiplexer (MUX 130 in FIG. 1) and supplied to the functional units for parallel execution.

If, at 401, it is determined that no Pick 0 instruction of Scenario 1 has been identified from the queue, then at 402 it is further determined whether a Pick 0 instruction of Scenario 2 has been identified from the queue. If yes, Scenario 2 is selected at 404. Therefore, the identified instructions of Pick 0, Pick 1, Pick 3, and Pick 4a or Pick 4b are output from the multiplexer (MUX 130 in FIG. 1) and supplied to the functional units for parallel execution. If not, Scenario 3 is selected as the default for supplying the identified instructions at 403.

Figure 4B:
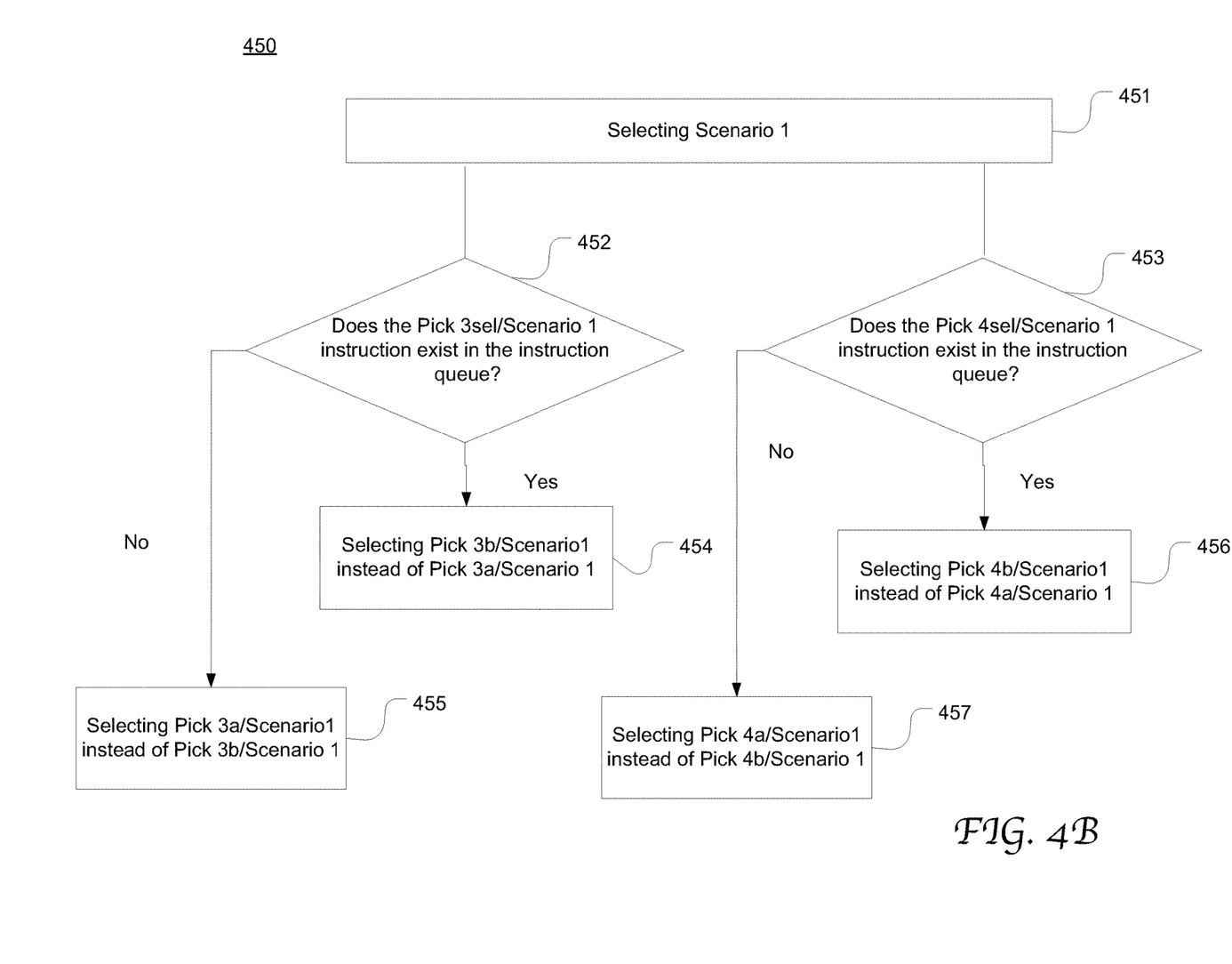
FIG. 4B is a flow chart depicting an exemplary process of selecting between Pick 3a and Pick 3b and between Pick 4a and Pick 4b for Scenario 1 based on instruction identification results given the predefined picks and scenarios shown in FIGS. 3A-3B in accordance with an embodiment of the present disclosure.

FIG. 4B is a flow chart depicting an exemplary process 450 of selecting between Pick 3a and Pick 3b and between Pick 4a and Pick 4b for Scenario 1 based on identification results given the predefined picks and scenarios shown in FIGS. 3A-3B in accordance with an embodiment of the present disclosure. Process 450 may be performed by the selection control module 110 in FIG. 1 for example. Once the selection control module determines (at 451) to select Scenario 1 because its Pick 0 finding logic identifies an instruction from the queue, it further determines (at 452) whether the Pick 3 sel/Scenario 1 instruction has been identified from the queue. If yes, Pick 3b/Scenario 1 is selected to supply the identified instruction at 454; if not, Pick 3a/Scenario 1 is selected to supply the identified instruction at 455. Similarly, if the Pick 4sel/Scenario 1 instruction has been identified from the queue as determined in 453, Pick 4b/Scenario 1 is selected to supply the identified instruction at 456; if not, Pick 4a/Scenario 1 is selected to supply the identified instruction at 457.

Figure 4C:
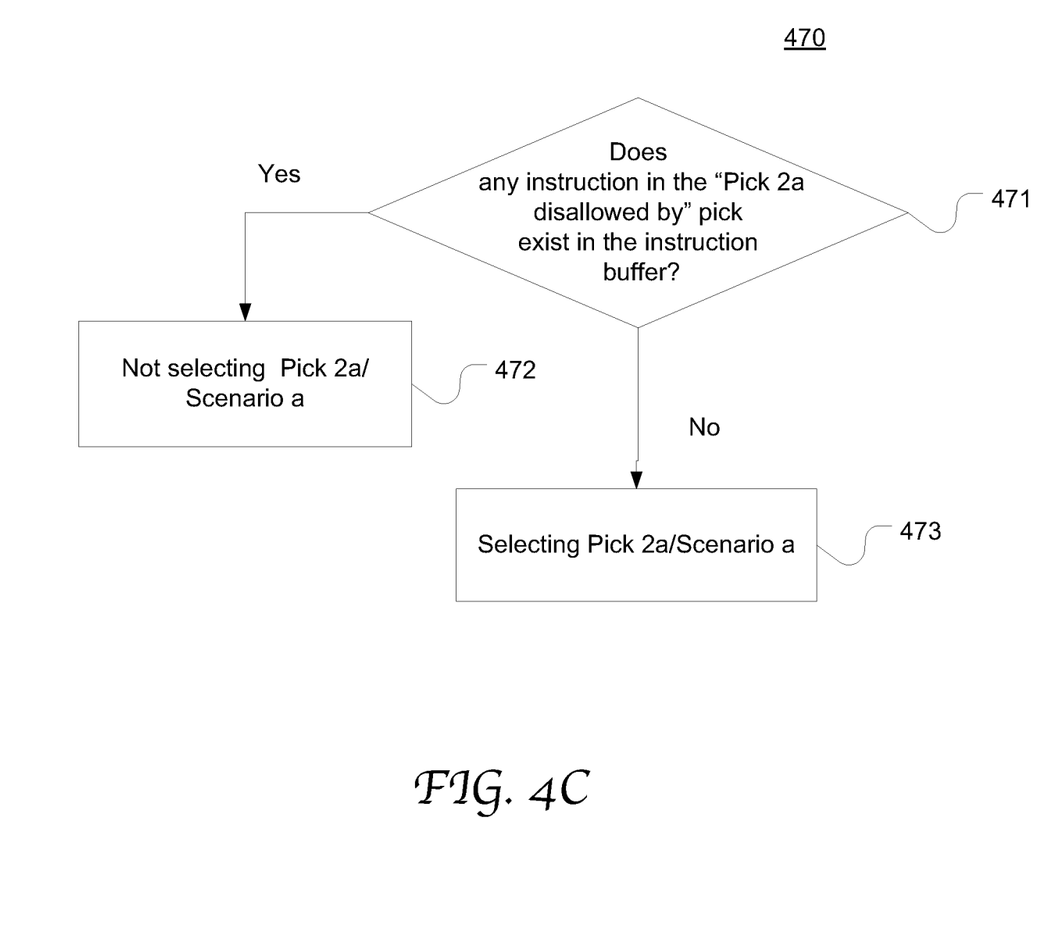
FIG. 4C is a flow chart depicting an exemplary process of selecting a second type of scenarios based on instruction identification results given the predefined picks and scenarios shown in FIGS. 3A-3B in accordance with an embodiment of the present disclosure.

FIG. 4C is a flow chart depicting an exemplary process 470 of selecting a second type of scenarios based on instruction identification results given the predefined picks and scenarios shown in FIGS. 3A-3B. At 471, the selection control module determines whether any instruction in the "Pick 2a disallowed by" pick has identified. If yes, Scenario a is not selected; else, Scenario a, and so the Pick 2a instruction is selected. Similar process can be used to select Scenarios b and c.

In some embodiments, the selection control module includes zero-detect logic and operates to select a scenario responsive to non-zero detection of one or more particular picks. The zero-detect logic can detect whether an instruction has been identified from the queue for a pick by the finding logic. For example, in response to non-zero detection of the Pick 0/Scenario 1 finding logic output, Scenario 1 is selected. Scenario 2 is selected in response to non-zero detection of the Pick 0/Scenario 2 finding logic output and zero detection of the Pick 0/Scenario 1. Scenario a is selected in response to non-zero detection of the "Pick 2a disallowed by" pick finding logic output. As a result, the selection control module sends select signals to the multiplexer to output the selected instructions.

Figure 5:
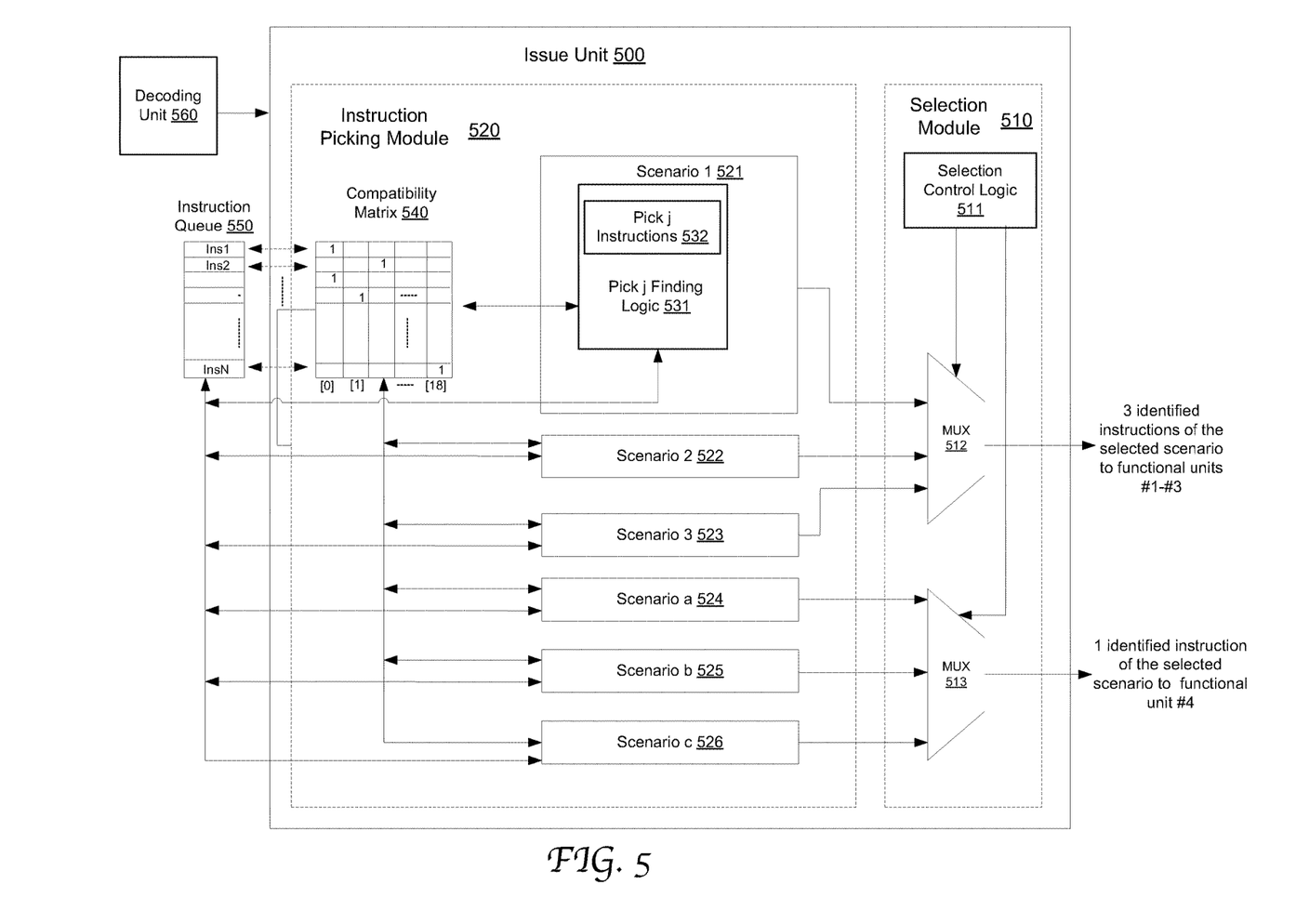
FIG. 5 illustrates the configuration of an exemplary issue unit capable of selecting a collection of compatible instructions by using the predefined picks and scenarios shown in FIGS. 3A and 3B in accordance with an embodiment of the present disclosure.

FIG. 5 illustrates the configuration of an exemplary issue unit 500 capable of selecting a collection of compatible instructions by using the predefined picks and scenarios shown in FIGS. 3A and 3B in accordance with an embodiment of the present disclosure. The issue unit 500 is coupled to the decoding unit 560 used for decoding fetched instructions and coupled to the instruction queue 560 used to list issue-ready instructions, e.g., Ins 1 and Ins 2. The instruction picking module 520 in the issue unit is configured in accordance with the predefined 19 picks and 6 scenarios 521-526 as defined in FIGS. 3A and 3B.

FIGS. 3A and 3B show that each pick is associated with a compatibility vector "Compat", such as Pick 0/Scenario 1 associated with vector Compat [0], Pick 2a/Scenario a associated with vector Compat[12], "Pick 2b disallowed by"/Scenario b associated with vector Compat[15]. The decoding unit maintains an N×19 compatibility matrix 540, where each row corresponds to one of the N positions in the queue 550, and each column corresponds to one of the 19 picks as well as the compatibility vector associated with the pick. For an issue-ready instruction placed in the $k_{th}$ position of the queue, the decoding unit classifies it into a pick, e.g., Pick j (with Compat[j]), and make the element (k, j) in the matrix become "1." In the identification stage, the finding logic for each pick uses the compatibility matrix 540 to identify an instruction from the instructions present in the queue and associated with the pick. As described with reference to FIGS. 3A-4C, the finding logic is specific to the instruction compositions of the picks and therefore performs different identification processes, such as find-first, find-oldest, find-last, etc. For example, the Pick j finding logic 531 finds the first instruction associated with column j of the matrix and outputs it as the identified instruction for Pick j. In some embodiments, instructions in the instruction queue are arranged and maintained in entrance order, e.g., by using a collapsing queue. In this configuration, finding the first instruction is equivalent to finding the oldest in the queue. In some other embodiments, the instructions are arranged out of order and thus the queue location of an instruction does not directly correspond to its age. In this case, finding the first instruction is not equivalent to finding the oldest in the queue. However, this discussion is merely exemplary. The finding logic and the instruction queue used in embodiments of the present disclosure can be implemented in any suitable manner that is well known in the art.

The finding logic operates concurrently for all the picks. However, in some other embodiments, the picks may be divided into groups, and the finding logic may operate concurrently for each group, but one group after another. It will be appreciated that the present disclosure is not limited to any specific algorithm or circuitry logic used to implement the instruction picking module that can concurrently identify instructions from the queue for multiple picks.

The identified instructions for all the picks are then supplied to the selection module 510. Based on these identification results, the selection control module 511 applies predefined policies and selects one or more scenarios and the picks as described in greater detail with reference to FIGS. 3A-4C. The selection control module 511 generates select signals to the MUX 512 and MUX 513 to output the identified instructions of the selected picks and selected scenarios. For instance, the selected instructions include 3 instructions identified according to Scenario 2 522 and 1 instruction identified according to Scenario b 525. The output instructions are then issued to corresponding functional units for parallel processing.

Figure 6:
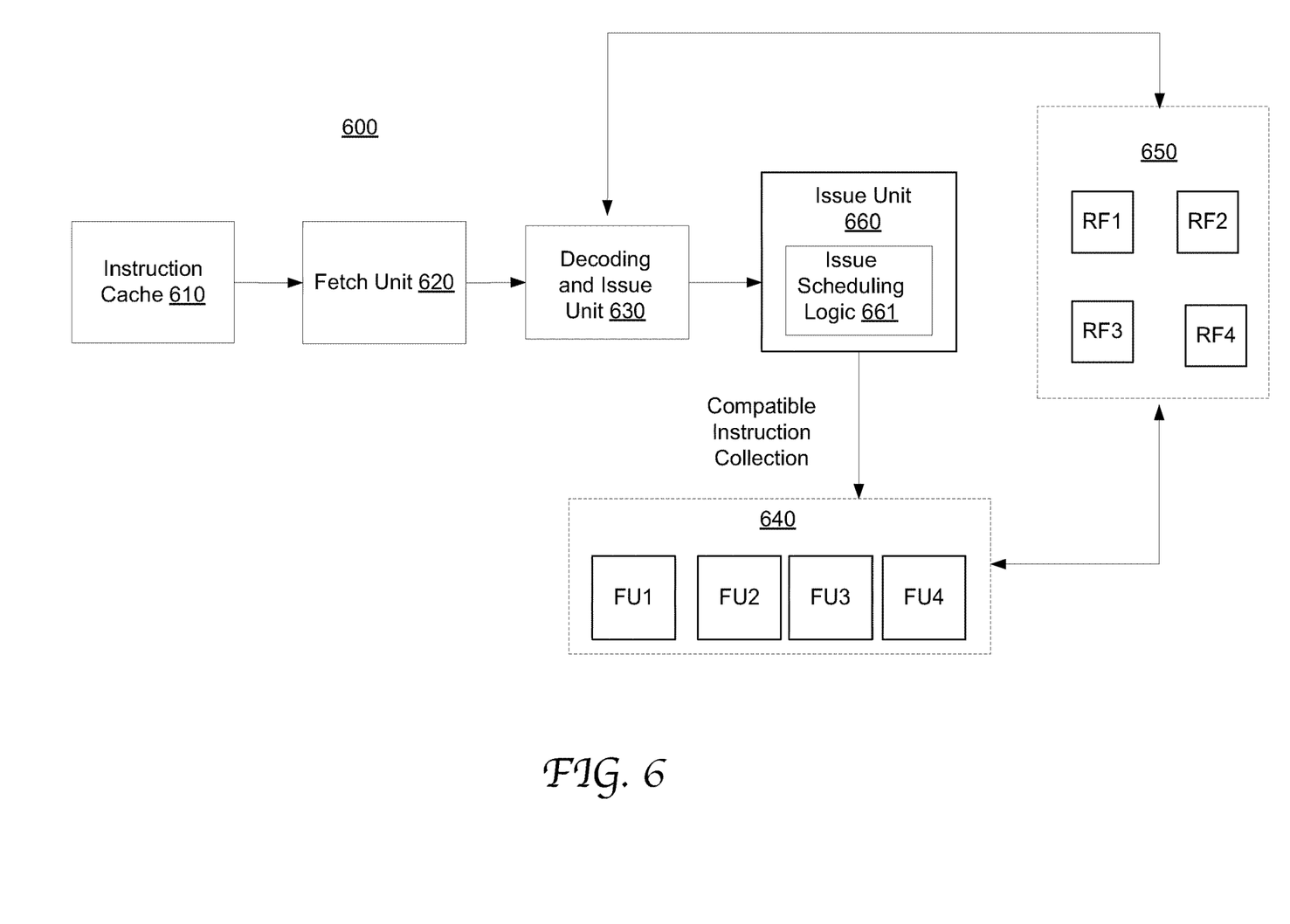
FIG. 6 is a block diagram illustrating an exemplary superscalar processor that is capable of issuing instructions according to predefined scenarios in accordance with an embodiment of the present disclosure.

A superscalar processor according to embodiments of the present disclosure may be used as a processor in a wide range of computing systems, such as general-purposes computer, network controllers, routers, firewalls, servers, game consoles, smart phones, etc. FIG. 6 is a block diagram illustrating an exemplary superscalar processor 600 capable of issuing compatible instructions according to predefined scenarios in accordance with an embodiment of the present disclosure. Processor 600 includes an instruction cache 610, a fetch unit 620, a decoding 630, an issue unit 660, functional units 640 (e.g., arithmetic logic unit (ALUs)) and register files 650. The issue unit 660 includes scheduling logic 661 configured to use predefined scenarios to schedule a collection of compatible instructions for parallel execution by the functional units 640 in a single execution cycle.

Processor 600 includes an instruction cache 610 for temporarily storing instructions prior to their dispatch to the downstream components. During operation, instruction code may be provided to instruction cache 610 by prefetching instructions from a main memory through a prefetch/predecode unit (not shown). The fetch unit 620 can fetch multiple instructions from the cache 610 for each clock cycle and place them into a queue. The decoding unit 630 decodes the fetched instructions, identifies control-flow changing branch instructions to provide quick feedback to the fetch stage and determines data dependencies of the instructions.

The issue unit 660 checks whether an instruction's operands are available yet. Any instruction whose operands are available is a candidate for issue and the issue unit will check whether the requested functional unit is available. If the required functional unit, register file and data are all available to an instruction, it is placed in the issue-ready instruction queue.

The decoding unit 630 classifies each issue-ready instruction into a predefined pick, e.g., by maintaining a compatibility matrix. The issue unit 660 includes scheduling logic 661 that can determine a collection of compatible issue-ready instructions based on predefined the scenarios and picks according to an embodiment of the present disclosure, as described in greater detail with reference to FIGS. 1-5. The compatible instructions are simultaneously issued to the functional units 640 for parallel execution in a single clock cycle. The functional units have write and read ports coupled to the register file 650, and output the execution results to the register file 650. A superscalar processor according to an embodiment of the present disclosure may include various other functional components are well known in the art.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method of scheduling compatible issue-ready instructions for execution by functional units in a processor, said method comprising:
   accessing an instruction queue comprising a plurality of issue-ready instructions;
   identifying a first instruction from said instruction queue, wherein said first instruction is comprised in a first group of instructions;
   identifying a second instruction from said instruction queue, wherein said second instruction is comprised in a second group of instructions, wherein said first group of instructions and said second group of instructions are both comprised in a first scenario of a plurality of scenarios, wherein each scenario of said plurality of scenarios comprises a different set of instruction opcodes, wherein each set of said instruction opcodes is defined to avoid conflicts among said plurality of issue-ready instructions with respect to parallel execution of instructions of said plurality of issue-ready instructions by corresponding functional units of said processor, wherein said first scenario comprises instructions corresponding to a set of said instruction opcodes, wherein said instructions of said first scenario include said first instruction and said second instruction, and wherein further said first instruction and said second instruction are compatible with respect to said parallel execution; and
   selecting said first instruction and said second instruction for issuing to corresponding functional units of said processor for parallel execution, wherein said selecting comprises selecting said first scenario from said plurality of scenarios based on a determination that an instruction that is comprised in said first and second groups of instructions of said first scenario is identified from said instruction queue.

2. The method of claim 1, wherein said identifying said first instruction and said identifying said second instruction are performed concurrently.

3. The method of claim 1, wherein each scenario of said plurality of scenarios comprises instructions, wherein said instructions of said each scenario of said plurality of scenarios comprises a first priority group, and wherein said determination further comprises a determination that said instruction that is comprised in said first and second groups of instructions of said first scenario is also comprised in said first priority group of said first scenario.

4. The method of claim 3 further comprising, concurrently for multiple groups in said plurality of scenarios, identifying an instruction from said instruction queue that is comprised in a respective group of said multiple groups, wherein said multiple groups comprise said first group of instructions and said second group of instructions of said first scenario, and wherein said selecting said first scenario is further based on respective priority levels associated with said plurality of scenarios.

5. The method of claim 3 further comprising, concurrently for multiple groups of said plurality of scenarios, identifying an instruction from said instruction queue that is comprised in a respective group of said multiple groups, wherein said multiple groups comprise said first group of instructions and said second group of instructions of said first scenario, and wherein said selecting said first scenario is further based on a determination that no instruction comprised in said instruction queue is comprised in a first priority group of any scenario that has a higher priority level than said first scenario.

6. The method of claim 3 further comprising:
concurrently for multiple groups of said plurality of scenarios, identifying an instruction from said instruction queue that is comprised in a respective group of said multiple groups, wherein said multiple groups comprise said first group of instructions and said second group of instructions of said first scenario;
responsive to a determination that a third instruction comprised in a third group of instructions of said first scenario is identified from said instruction queue, selecting an identified instruction from a fourth group of instructions of said first scenario without selecting an identified instruction from a fifth group of instructions of said first scenario, wherein any instruction comprised in said fourth group of instructions is compatible with said third instruction, and wherein further said fifth group of instructions comprises an instruction that is incompatible with said third instruction.

7. The method of claim 3 further comprising:
concurrently for multiple groups of said plurality of scenarios, identifying an instruction from said instruction queue that is comprised in a respective group of said multiple groups, wherein said multiple groups comprise said first group of instructions and said second group of instructions of said first scenario, and wherein further said first scenario is a default scenario; and
responsive to a determination that said instruction queue comprises no instruction that is comprised in any first priority group of said plurality of scenarios, selecting identified instructions from groups of said default scenario for issuing for parallel execution.

8. The method of claim 3 further comprising:
concurrently identifying respective instructions from said instruction queue that are comprised in multiple groups of instructions of said plurality of scenarios, wherein said plurality of scenarios further comprises a second scenario, and wherein said second scenario comprises a first group and a second group; and
responsive to a determination that no instruction comprised in said second group of said second scenario is identified from said instruction queue, selecting an identified instruction that is comprised in said first group of said second scenario for issuing with said first instruction and said second instruction for parallel execution.

9. The method of claim 1, wherein said second instruction is identified according to a finding process that is different from a finding process used for said identifying said first instruction when said second instruction is comprised in both said first group of instructions and said second group of instructions, and wherein said identifying said first instruction and said identifying said second instruction comprise:
identifying said first instruction from said instruction queue according to a find-first process; and
identifying said second instruction from said instruction queue according to a find-last process, wherein said second instruction is comprised in both said first group of instructions and said second group of instructions.

10. The method of claim 1, wherein said identifying said first instruction comprises selecting said first instruction from multiple instructions according to a find-first process, and wherein further said multiple instructions are each comprised both in said instruction queue and in said first group of instructions.

11. The method of claim 1, wherein said selecting said first scenario is also based on non-zero detection of one or more of said first group of instructions and said second group of instructions.

12. A processor comprising:
a plurality of functional units operable to execute compatible instructions in parallel; and
issue logic coupled to said plurality of functional units and configured to issue said compatible instructions to said plurality of functional units, wherein said issue logic comprises:
first logic configured to:
identify a first instruction from an instruction queue, wherein said first instruction is comprised in a first group of instructions; and
identify a second instruction from said instruction queue, wherein said second instruction is comprised in a second group of instructions, wherein said first group of instructions and said second group of instructions are both comprised in a first scenario of a plurality of scenarios, wherein each scenario of said plurality of scenarios comprises a different set of instruction opcodes, wherein each set of said instruction opcodes is defined to avoid conflicts among a plurality of issue-ready instructions with respect to parallel execution of instructions of said plurality of issue-ready instructions by corresponding functional units of said processor, wherein said first scenario comprises instructions corresponding to a set of said instruction opcodes, wherein said instructions of said first scenario include said first instruction and said second instruction, and wherein further said first instruction and said second instruction are compatible with respect to said parallel execution; and
second logic configured to:
select said first instruction and said second instruction for supplying to corresponding functional units of said processor for execution in parallel; and
select said first scenario from said plurality of scenarios based on a determination that an instruction that is comprised in said first and second groups of instructions of said first scenario is identified from said instruction queue.

13. The processor of claim 12 further comprising decoding logic configured to:
decode said plurality of issue-ready instructions of said compatible instructions; and
classify each instruction of said plurality of issue-ready instructions into a plurality of groups, wherein each group of said plurality of groups comprises a set of instructions.

14. The processor of claim 12, wherein each scenario of said plurality of scenarios comprises instructions, wherein said instructions of said each scenario of said plurality of scenarios comprises a first priority group, and wherein said determination further comprises a determination that said instruction that is comprised in said first and second group of instructions of said first scenario is also comprised in said first priority group of said first scenario.

15. The processor of claim 14, wherein said first logic is configured to identify said first instruction from multiple instructions according to a find-first process, and wherein further said multiple instructions are each comprised both in said instruction queue and in said first group of instructions.

16. The processor of claim 14,
wherein said first logic is further configured to, concurrently for multiple groups of said plurality of scenarios, identify an instruction from said instruction queue that is comprised in a respective group of said multiple groups, wherein said multiple groups comprise said first group of instructions and said second group instructions of said first scenario, and
wherein said second logic is further configured to, responsive to a determination that a third instruction comprised in a third group of instructions of said first scenario is identified from said instruction queue, select an identified instruction from a fourth group of instructions of said first scenario without selecting an identified instruction from a fifth group of instructions of said first scenario, wherein any instruction comprised in said fourth group of instructions is compatible with said third instruction, and wherein further said fifth group of instructions comprises an instruction that is incompatible with said third instruction.

17. The processor of claim 14,
wherein said first logic is further configured to, concurrently for multiple groups of said plurality of scenarios, identify an instruction from said instruction queue that is comprised in a respective group of said multiple groups, wherein said multiple groups comprise said first group of instructions and said second group of instructions of said first scenario, wherein further said first scenario is a default scenario, and
wherein further said second logic is further configured to, responsive to a determination that no instruction that is comprised in any first priority group of said plurality of scenarios is identified from said instruction queue, select identified instructions from groups of said default scenario for issuing for parallel execution.

18. The processor of claim 14,
wherein said first logic is further configured to, concurrently for multiple groups of said plurality of scenarios, identify an instruction from said instruction queue that is comprised in a respective group of said multiple groups of said plurality of scenarios, wherein said plurality of scenarios further comprises a second scenario, and wherein said second scenario comprises a first group and a second group, and wherein said second logic is further configured to, responsive to a determination that no instruction comprised in said second group of said second scenario is identified from said instruction queue, select an identified instruction that is comprised in said first group of said second scenario for parallel execution with said first instruction and said second instruction.

19. The processor of claim 14,
wherein said first logic is further configured to, concurrently for multiple groups of said plurality of scenarios, identify an instruction from said instruction queue that is comprised in a respective group of said multiple groups,
wherein said multiple groups comprise said first group of instructions and said second group of instructions of said first scenario, and
wherein said second logic comprises a multiplexer and is configured to select said first scenario further based on respective priority levels associated with said plurality of scenarios.

20. The processor of claim 19, wherein said second logic is configured to select said first scenario further based on a determination that no instruction in said instruction queue is comprised in a first priority group of any scenario that has a higher priority level than said first scenario.

21. The processor of claim 12, wherein said first logic is configured to identify said second instruction according to a finding process that is different from a finding process used to identify said first instruction when said second instruction is comprised in both said first group of instructions and said second group of instructions, and wherein said first logic is configured to:
identify said first instruction from said instruction queue according to a find-first process; and
identify said second instruction from said instruction queue according to a find-last process, wherein said second instruction is comprised in both said first group of instructions and said second group of instructions.

22. The processor of claim 12, wherein said selection of said first scenario is also based on non-zero detection of one or more of said first group of instructions and said second group of instructions.

* * * * *